United States Patent [19]

Thurler et al.

[11] Patent Number: 5,690,451
[45] Date of Patent: Nov. 25, 1997

[54] DEPTH STOP ASSEMBLY FOR A PORTABLE ELECTRIC DRILL

[75] Inventors: James E. Thurler, Pickens; Michael E. Sheriff, Easley, both of S.C.

[73] Assignee: Ryobi North America Corp., Easley, S.C.

[21] Appl. No.: 509,463

[22] Filed: Jul. 31, 1995

[51] Int. Cl.$^6$ .............................. B23B 49/00; B23B 45/14
[52] U.S. Cl. ........................................ 408/113; 408/241 S
[58] Field of Search ............................. 408/113, 241 S, 408/110, 14

[56] References Cited

U.S. PATENT DOCUMENTS

| | | |
|---|---|---|
| 2,430,812 | 11/1947 | Goldberg . |
| 2,978,931 | 4/1961 | Broden ........................ 408/113 |
| 3,460,408 | 8/1969 | Raymond . |
| 3,527,273 | 9/1970 | Falter . |
| 3,537,336 | 11/1970 | Schmuck . |
| 3,550,481 | 12/1970 | Jensen . |
| 3,779,663 | 12/1973 | Ruggles ........................ 408/113 |
| 4,113,404 | 9/1978 | Lippacher et al. . |
| 4,235,565 | 11/1980 | Albano . |
| 4,256,422 | 3/1981 | Theissig et al. . |
| 4,276,675 | 7/1981 | Pioch . |
| 4,281,949 | 8/1981 | Bugarin . |
| 4,354,779 | 10/1982 | Vaughan . |
| 4,495,681 | 1/1985 | Eckman . |
| 4,881,294 | 11/1989 | Riedl . |
| 5,006,022 | 4/1991 | Miller . |
| 5,049,012 | 9/1991 | Cavedo ........................ 408/241 S X |
| 5,295,620 | 3/1994 | Cousineau et al. . |

FOREIGN PATENT DOCUMENTS 1133729  10/1982  Canada .

*Primary Examiner*—Daniel W. Howell
*Assistant Examiner*—Henry W. H. Tsai
*Attorney, Agent, or Firm*—Brooks & Kushman P.C.

[57] ABSTRACT

A drill assembly including a drill and depth stop assembly is disclosed. The drill includes a housing, an electric motor and a chuck operatively driven by the electric motor about a drill axis. The depth stop assembly includes a depth stop rod, a mounting block, a fastener and a rotatable handle. The mounting block has a mounting surface adapted to cooperate with the housing, a first aperture spaced from the mounting surface for supporting the depth stop rod generally parallel to the drill axis, and a second aperture extending about a fastener axis generally normal the mounting surface. The fastener extends through the mounting block second aperture about the fastener axis and has two ends respectively cooperative with the housing and the handle to releasably entrap the mounting block therebetween to enable a user to adjustably position the depth stop rod relative to the housing. Preferably the fastener threadedly attaches to a threaded aperture in the drill housing. Ideally, the mounting block includes first and second mounting block halves which releasably clamp about the depth stop rod.

15 Claims, 4 Drawing Sheets

DEPTH STOP ASSEMBLY FOR A PORTABLE ELECTRIC DRILL

TECHNICAL FIELD

This invention relates to depth stop assemblies for portable electric drills.

BACKGROUND OF THE INVENTION

Depth stop assemblies mounted on drills serve to limit the depth drill bits bore into workpieces during drilling operations. A typical depth stop assembly includes a mounting assembly which mounts a depth stop rod to a drill. The drill often has a motor housing or casing which includes a nose portion disposed behind a chuck which holds a drill bit.

Examples of depth stop assemblies are found in U.S. Pat. Nos. 4,881,294 and 5,049,012. Each of these depth stop assemblies have a collar which clamps about the nose portion of a drill. The '012 patent uses a single threaded fastener on a handle to simultaneously clamp the collar about the nose portion and to bear against the depth stop rod to prevent movement of the depth stop rod relative to a drill. The depth stop assembly of the '294 patent also uses a single fastener on a handle to effect the clamping of the collar about the nose portion. A U-shaped portion on the depth stop assembly contracts to clamp about a depth stop rod when the fastener is tightened.

These depth stop assemblies have a number of drawbacks. First, the assemblies are relatively complicated and expensive to make. Second, the fastener in the depth stop assembly of the '012 patent, which bears on the depth stop rod, can mar and damage the depth stop rod. This may create burrs or indentations on the depth stop rod which can make sliding the depth stop rod within the retaining depth stop rod aperture difficult. Third, the depth stop assemblies are clamped about the outer periphery of the nose portions. This increases the periphery of the drill assembly and can make it difficult to position the nose portion into tight or constrained spaces. Moreover, when the fasteners are loosened so that the position of depth stop rods may be adjusted, the depth stop assemblies may become circumferential unconstrained and unstable. Ideally, a handle will remain extended generally horizontal relative to the drill when the drill is held in a normal horizontal orientation during operation.

Other depth stop assemblies use multiple fasteners. One fastener may be used to clamp a collar about the housing of the drill. A second fastener may be employed to tighten and untighten the mounting assembly about the depth stop rod. The requirement of tightening two separate fasteners and/or having a circumferentially unstable clamping connection on the drill is undesirable.

The present invention is intended to overcome the above cited shortcomings.

SUMMARY OF THE INVENTION

The present invention includes a drill assembly including a drill and depth stop assembly. The drill includes a housing, an electric motor and a chuck operatively driven by the electric motor about a drill axis. The depth stop assembly has a depth stop rod, a mounting block, a fastener and a rotatable handle. The mounting block has a mounting surface adapted to cooperate with the housing, a first aperture spaced from the mounting surface for supporting the depth stop rod generally parallel to the drill axis, and a second aperture extending generally normal to the mounting surface. The fastener extends through the mounting block second aperture about a fastener axis and has two ends respectively cooperative with the drill housing and the handle to releasably entrap the mounting block therebetween to enable a user to adjustably position the depth stop rod relative to the housing.

Preferably, the fastener threadedly attaches to a threaded aperture in the drill housing. Ideally, the mounting block includes first and second mounting block halves which releasably clamp about the depth stop rod. The second mounting block half may be a resilient washer which is captured within a cavity in the first mounting block half. The cavity may be in communication with the first and second apertures.

It is an object of the present invention to provide a depth stop assembly which is more compact and economical to make than conventional depth stop assemblies.

It is another object to provide a depth stop assembly which utilizes a resilient washer contoured to fit the radius of a depth stop rod to provide more surface contact or bearing area than conventional depth stop assemblies and which does not mar the depth stop rod.

It is an additional object to provide a depth stop assembly wherein a depth stop rod is located closer to the centerline of a drill bit than conventional depth stop assemblies.

It is also an object to provide a mounting block which is keyed to the housing of the drill to prevent the mounting block from rotating relative to the housing when the depth of the depth stop rod is being adjusted.

It is yet another object to provide a resilient washer which snaps into and is captured within a recess of a mounting block to prevent the resilient washer from accidently being lost.

BRIEF DESCRIPTION OF THE DRAWINGS

These and other features, objects, and advantages of the present invention will become readily apparent from the following description, pending claims, and accompanying sheets of drawings where:

BEST MODE FOR CARRYING OUT THE INVENTION

Figure 1:
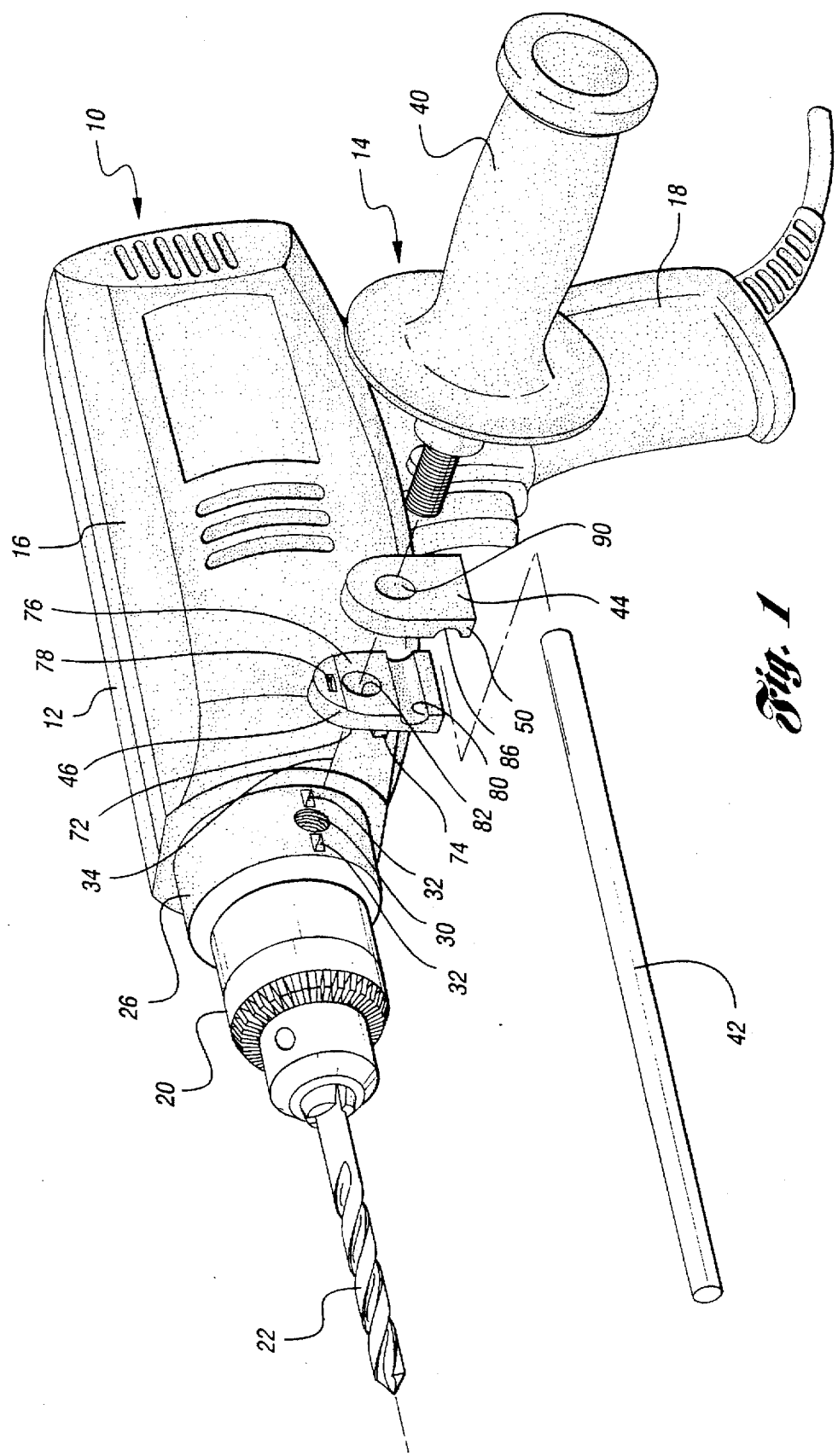
FIG. 1 is an exploded perspective view of a portable electric drill and a first embodiment of a depth stop assembly made in accordance with the present invention.

FIG. 1 illustrates a drill assembly 10 including a drill 12 and a depth stop assembly 14. Drill 12 has a motor housing 16 with a motor (not shown) therein. Located forward of the motor housing 16 is a chuck 20 which releasably holds a drill bit 22. Drill bit 22 extends along a drill axis 24.

Motor housing 16 includes a nose portion 26. Formed in the side of nose portion 26 is a threaded opening 30 and a pair of rectangular longitudinally spaced keyways or recesses 32. Threaded opening 30 is coaxial with a first axis 34.

Drill stop assembly 14 includes handle assembly 40, a depth stop rod 42 and a mounting block 44. Mounting block 44 includes first and second mounting block halves 46 and 50.

Figure 2:
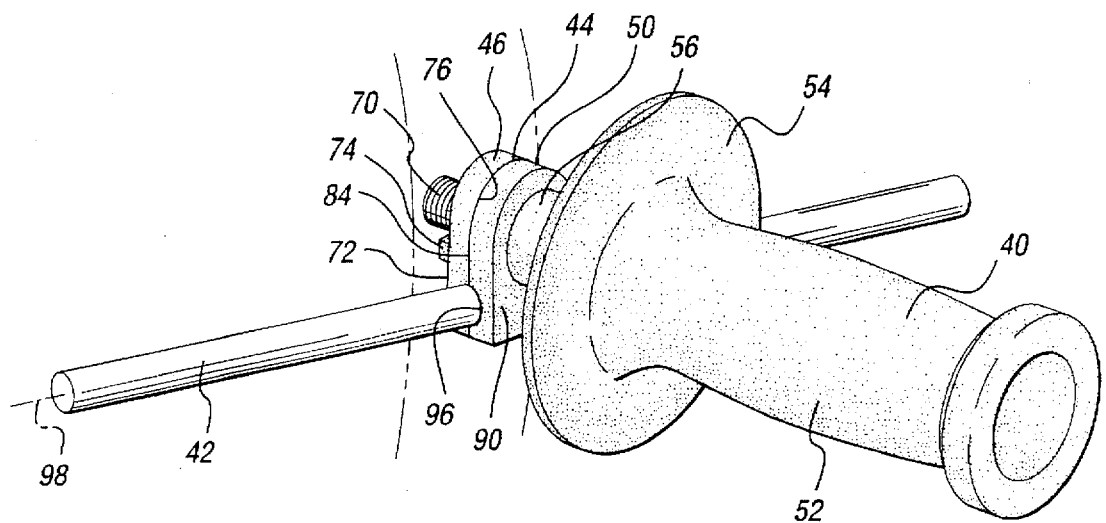
FIG. 2 is an enlarged perspective view of the depth stop assembly of FIG. 1.
Figure 3:
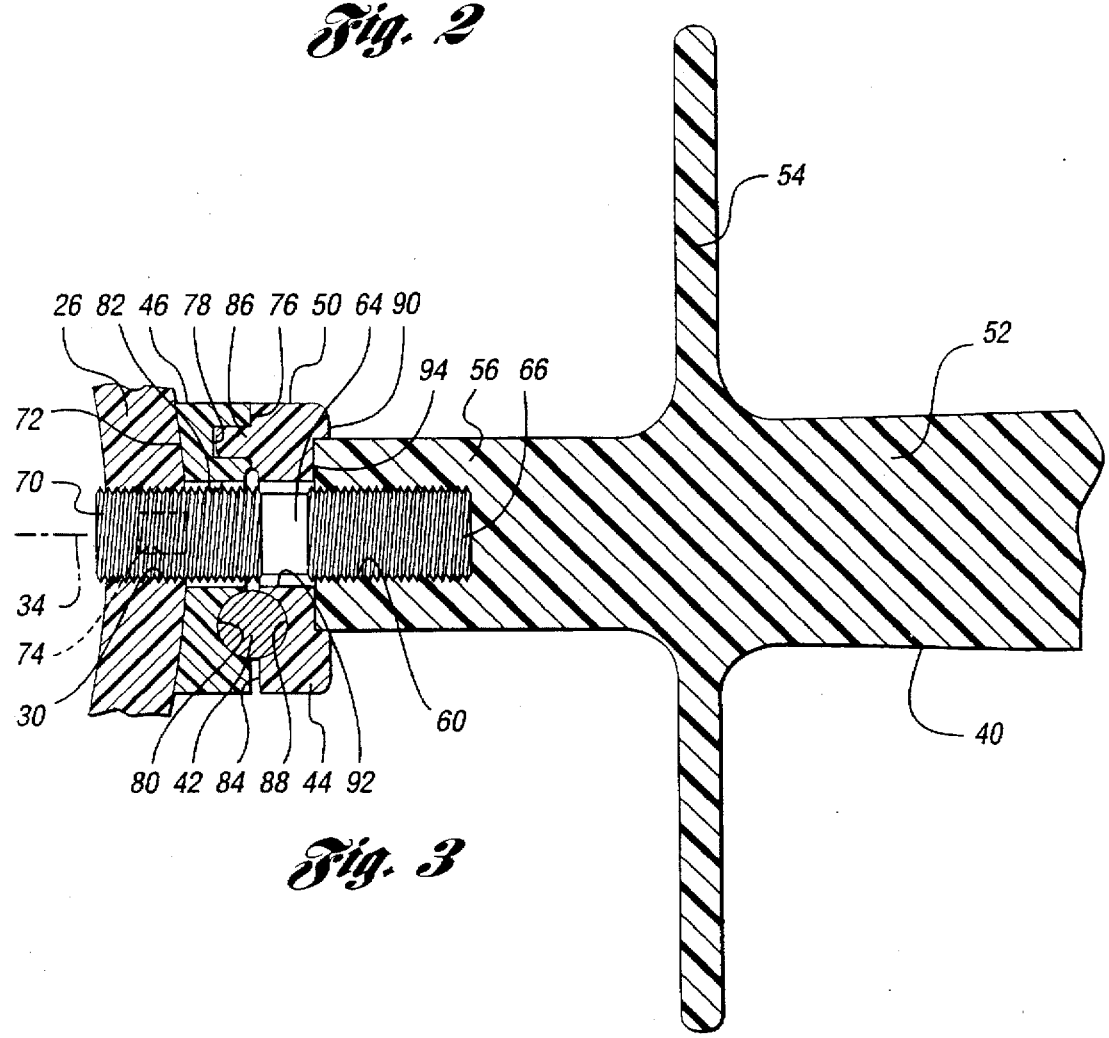
FIG. 3 is an enlarged fragmentary sectional view of the depth stop assembly mounting to the drill.
Figure 5:
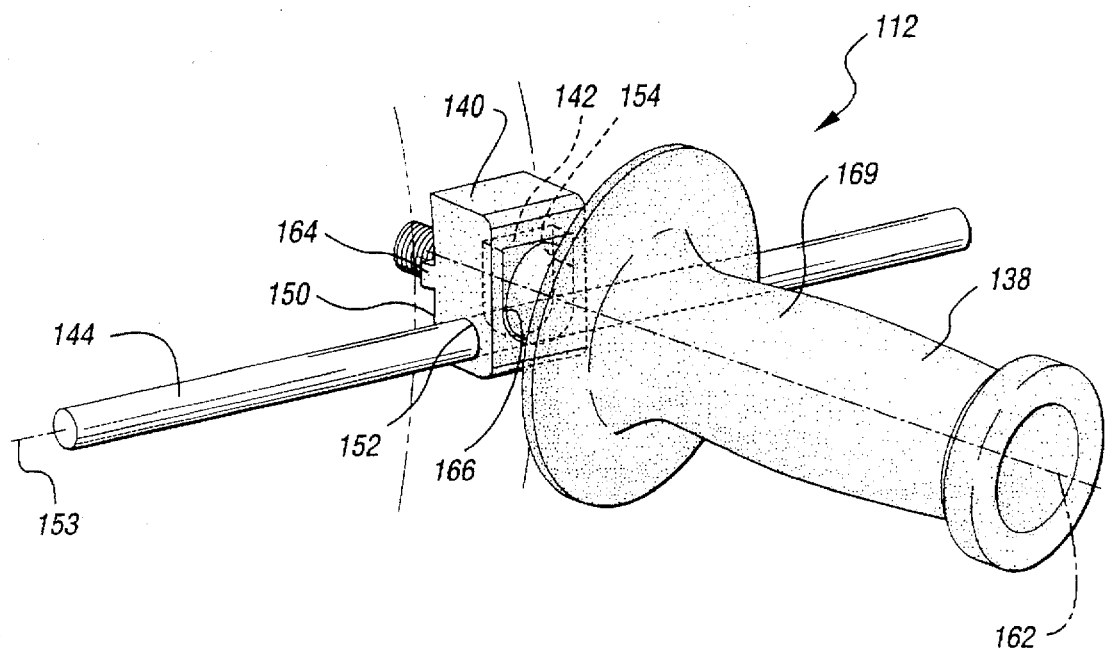
FIG. 5 is an enlarged fragmentary perspective view, partially in cutaway, of the depth stop assembly of FIG. 4.

Turning now to FIGS. 2 and 3, handle assembly 40 comprises a cylindrical handle portion 52, a circular flange 54 and a forward portion 56. A threaded aperture 60 is formed in the forward portion 56. Handle assembly 40 also includes a fastener or rod 64. Rod 64 has a threaded rear portion 66 and a forward threaded portion 70. Rear portion 66 is threadedly retained within threaded aperture 60.

Again, mounting block 44 includes first mounting block half 46 and second mounting block half 50. First mounting block half 46 has a mounting surface 72 which is preferably complementary with the surface of nose portion 26. A pair of longitudinally spaced apart projections 74 are formed on the forward end of first mounting block half 46. Projections 74 are sized and shaped to be received snugly within respective recesses 32 on nose portion 26. On the opposite side of first mounting block half 46 is an inboard surface 76. A recess 78 and a longitudinally extending semi-cylindrical groove 80 are formed on inboard surface 76. An aperture 82 extends from inboard surface 76 to mounting surface 72.

Second mounting block half 50 has an inboard surface 84 with a projection 86 formed thereon and a semi-cylindrical groove 88. An outboard surface 90 is located opposite inboard surface 84. An aperture 92 extends through second mounting block half 50 from outboard surface 90 to inboard surface 84. Apertures 82 and 92 coaxially align along axis 34 when drill stop assembly 14 is mounted to drill 12. Outboard surface 90 on mounting half 50 has a stepped recess 94 which is slightly oversized to receive forward portion 56 of handle portion 52.

In operation, handle portion 52 threadedly receives rear threaded portion 66 of fastener 64 in threaded aperture 60 to form handle assembly 40. First mounting block half 46 and second mounting block half 52 are placed against one another with the inboard surfaces 76 and 84 abutting one another and with projection 86 being received within recess 78. Opposing semi-cylindrical grooves 80 and 88 cooperate to form a longitudinally extending aperture 96 which extends along a second or depth stop rod axis 98, as best seen in FIG. 2.

Forward threaded portion 70 of rod 64 is inserted through apertures 82 and 92 of first and second mounting block halves 46 and 50. Forward threaded portion 70 is then loosely threadedly engaged with threaded opening 30 in nose portion 26. Mounting surface 72 and projections 74 are placed against nose portion 26 with projections 74 being received within recesses 32 of nose portion 26. With projections 76 in recesses 32, mounting block 44 is prevented from rotating relative to nose portion 26 about axis 34. Apertures 82 and 92 of first and second block halves 46 and 50 are coaxially aligned along axis 34.

Depth stop rod 42 is longitudinally inserted into aperture 96 formed between first and second mounting block halves 46 and 50. The "depth" of depth stop rod 42 relative to mounting block 44 is axially adjusted to a desired position. Handle assembly 40 is then further threadedly tightened into threaded opening 30 until depth stop rod 42 is clampingly retained between cooperating grooves 80 and 88 of mounting block 44.

If the depth of depth stop rod 42 is to be longitudinally adjusted, handle assembly 40 is threadedly loosened within threaded opening 30 until depth stop rod 42 is easily moved within aperture 96. Because depth stop assembly 14 is threadedly received in motor housing 16, depth stop assembly 14 is circumferentially fixed relative to drill 12 and cannot rotate about drill axis 24 during adjustment of the depth of depth stop rod 42. Once the new position of depth stop rod 42 relative to mounting block 44 is established, handle portion 40 is again tightened down in threaded opening 30 locking depth stop rod 42 in the desired position.

Figure 4:
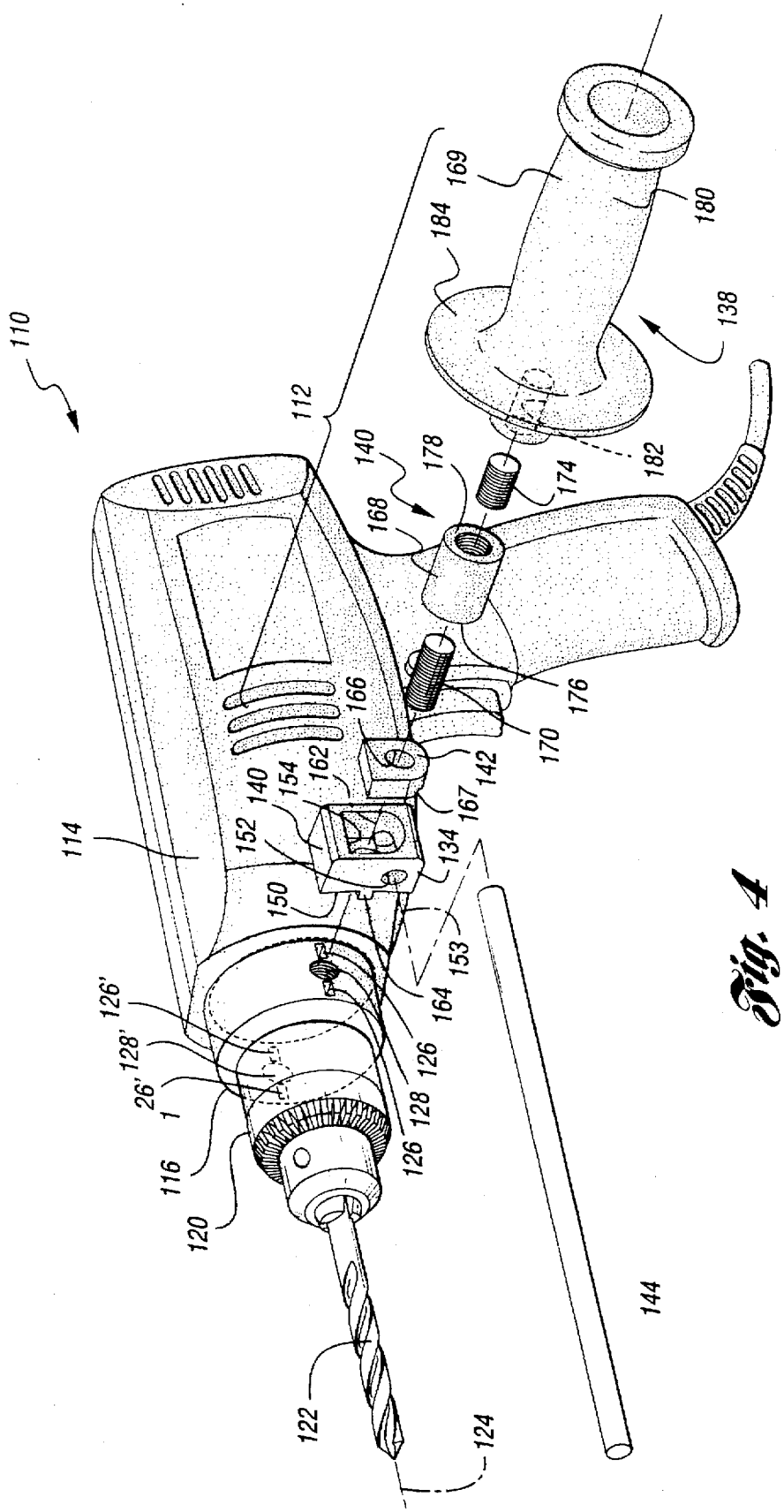
FIG. 4 is an exploded perspective view of a portable electric drill and a second embodiment of a depth stop assembly.

FIG. 4 is an exploded perspective view of a portable electric drill 110 and a second embodiment of a depth stop assembly 112 which mounts thereon. Drill 110 includes a housing 114 having a nose portion 116 and a chuck 120 which releasably holds a drill bit 122. Drill bit 122 extends along a drill axis 124. Located on opposite lateral sides of nose portion 116 are keyways or recesses 126 and 126' and threaded apertures 128 and 128'.

Depth stop assembly 112 has a mounting block 134 and a handle assembly 138. Mounting block 134 comprises a main or first mounting block half 140 and a second mounting block half or washer 142. A depth stop rod 144 is further included in depth stop assembly 112 and is slidably mounted in mounting block 134.

First mounting block half 140 has a mounting surface 150 which is complementary to and flushly mounts on the surface on nose portion 116. A first or depth stop rod aperture 152 is formed in mounting block 134 for receiving depth stop rod 144. First aperture 152 extends along a first axis 153 which extends generally parallel to drill axis 124. First aperture 152 is slightly oversized relative to depth stop rod 144. This allows depth stop rod 144 to slide relatively freely within first aperture 152.

Figure 6:
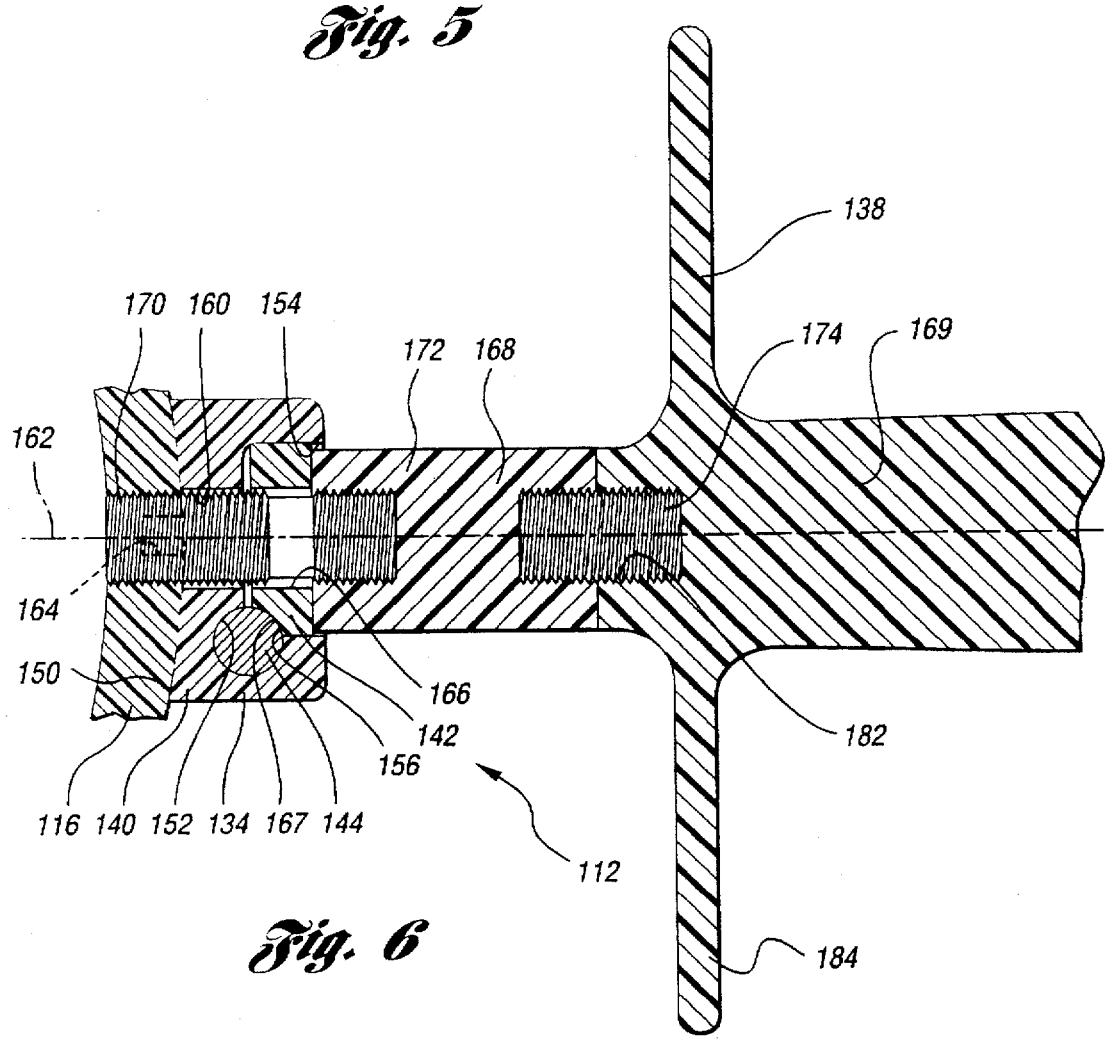
FIG. 6 is an enlarged fragmentary sectional view of the depth stop assembly of the second embodiment mounting to the drill.

A recess or cavity 154, preferably generally rectangular in shape, is formed in the rear portion of first mounting block half 140. A window 156, as best seen in FIG. 6 and which is ideally rectangular in shape, places recess 154 in communication with the central portion of first aperture 152.

A second aperture 160, extending along a second axis 162, extends from recess 154 to mounting surface 150. First axis 153 and second axis 162, although non-intersecting, preferably lie in planes perpendicular to one another. A pair of projections or keys 164 protrude forwardly on either side of second aperture 160 on front mounting surface 150. Keys 164 are sized and configured to fit within keyways 126 or 126', depending on which side of drill 110 depth stop assembly 112 is to be mounted.

Washer 142 is preferably made of resilient material such as synthetic rubber or plastic. Washer 142 has a central aperture 166 extending therethrough which coaxially aligns with second axis 162. Located along the upper front surface of washer 142 is a contoured or radiused surface 167 which complements the outer diameter of depth stop rod 144.

Handle assembly 138 includes an elongate fastener or mounting rod 168 and a handle 169. Elongate rod 168 includes a forward threaded end 170, an enlarged intermediate portion 172 and rear threaded end 174. Steps 176 and 178 are formed between forward threaded end 170 and enlarged intermediate portion 172 and rear threaded end 174 and enlarged intermediate portion 172.

Handle 169 includes a main body 180 with an internal threaded portion 182. Located at the forward end of body 180 is a circular flange 184. Forward threaded end 170 and rear threaded end 174 are respectively sized to be threadedly received within threaded aperture 128 in nose portion 116 and internal threaded portion 182 of handle 169.

In operation, mounting block 134 and handle assembly 138 are first assembled. Resilient washer 136 is placed into recess 154 of first mounting block half 140. Contoured surface 167 generally is located adjacent and extends through window 156 which is formed between recess 154 and first aperture 152. Next, handle 142 is threaded onto rear threaded end 174 of elongate rod 168. The combination of handle 169 and elongate rod 168 is inserted into recess 154 with forward threaded end 170 passing through central aperture 166 of washer 142. Depth stop rod 144 is then inserted within first aperture 152.

Mounting block 134 is placed adjacent nose portion 116 and keys 164 are introduced into keyways 126. This prevents mounting block 134 from rotating about second axis 162. Handle assembly 138 is rotated such that forward threaded end 170 is loosely received within threaded aperture 128 of nose portion 116. Depth stop rod 144 is then axially adjusted within first aperture 152 so that depth stop rod 144 is placed at a predetermined distance behind the forward end of drill bit 122. To lock depth stop rod 144 in the predetermined position, handle assembly 138 is rotated with forward threaded end 170 further threadedly engaging threaded aperture 128. Accordingly, forward step 176 bears upon washer 142 with contoured surface 167 bearing upon depth stop rod 144 over a fairly large bearing region. The size of the bearing region is determined by the arcuate length and width of contoured surface 167.

If it is desired to change the relative position of depth stop rod 144 relative to drill bit 122 and drill 114, handle assembly 138 is rotated in the opposite direction causing step 176 to back away from second aperture 160 and reduce the compression of washer 142 upon depth stop rod 144. However, sufficient threaded engagement is left between forward threaded end 170 and threaded aperture 128 to keep keys 164 engaged within elongate keyways 126 thereby preventing mounting block 134 from rotating about second axis 162. Depth stop rod 144 is then axially repositioned within first aperture 152. Handle 169 and elongate rod 168 are again turned to place washer 142 in compression against depth stop rod 144 to prevent axially movement of depth stop rod 144 relative to mounting block 134.

If it is desired to mount depth stop assembly 112 on the opposite lateral side of drill 114, forward threaded end 170 is disengaged from threaded aperture 128 on the left side of drill 114 and is reinstalled in the threaded aperture 128' located on the right hand side of drill 114. Similarly, keys 164 of mounting block 134 are inserted into elongate keyways 126'.

It should be appreciated that while keys 164 are engaged with the elongate keyways 126 or 126' to prevent rotation of mounting block 134 about second axis 162, other cooperative combinations of projections and recesses between mounting surface 150 and housing 114 can also be used to prevent rotation therebetween. Also, if drill 110 has no defined nose portion 116 thereon, other appropriate recesses for receiving depth stop assembly 112 in housing 114 could be used. Moreover, although not preferred, elongate rod 168 could be designed to directly bear upon depth stop rod 144. Further, nose portion 116 and mounting surface 150 could be planar surfaces or contoured surfaces.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A portable electric drill assembly comprising:

a drill including a housing, an electric motor and a chuck operatively driven by the electric motor about a drill axis;

a depth stop rod;

a mounting block having a mounting surface adapted to cooperate with the housing, a first aperture spaced from the housing between the mounting surface and an outboard surface for supporting the depth stop rod generally parallel to the drill axis, and a second aperture extending about a fastener axis passing through the mounting surface and the outboard surface;

a rotatable handle; and a fastener extending through the second aperture along the fastener axis and having two ends respectively cooperative with the housing and the handle to releasably entrap the mounting block therebetween to enable a user to adjustably position the depth stop rod relative to the housing, wherein the housing has an aperture therein for receiving an end of the fastener.

2. The drill assembly of claim 1 wherein:

the housing aperture is threaded.

3. The drill assembly of claim 1 wherein:

the mounting block and housing have at least one projection and at least one recess which cooperate to prevent the mounting block from rotating relative to the housing.

4. The drill assembly of claim 3 wherein:

the mounting block has the projection and the housing has the recess formed therein.

5. The drill assembly of claim 1 wherein:

the mounting block includes a first mounting block half having the mounting surface thereon and a second mounting block half which cooperates with the first mounting block half to releasably capture the depth stop rod therebetween.

6. The drill assembly of claim 5 wherein:

the first and second block halves each include semi-cylindrical grooves which cooperate to form the first aperture in which the depth stop rod is releasably captured.

7. The drill assembly of claim 5 wherein:

the second block half includes an elastomeric washer which cooperates with the first block half to releasably capture the depth stop rod therebetween.

8. The drill assembly of claim 7 wherein:

the first block half includes a cavity in which the washer resides.

9. The drill assembly of claim 8 wherein:

the cavity of the first block half is in communication with the first aperture and the second aperture.

10. The drill assembly of claim 8 wherein:

the washer has a bearing surface complementary in shape to the depth stop rod which bears upon the depth stop rod.

11. The drill assembly of claim 5 wherein:

the first and second block halves have opposing mating surfaces, the mating surfaces having at least one projection and at least one recess which cooperate with one another and the fastener to prevent the second block half from rotating relative to the first block half about the fastener axis.

12. The drill assembly of claim 1 wherein:
the fastener is an elongate rod with at least one of the ends threaded.

13. The drill assembly of claim 12 wherein:
both ends of the elongate rod are threaded.

14. A depth stop assembly mountable to a housing of a portable electric drill including a housing having a threaded aperture and an adjacent recess, an electric motor, and a chuck operatively driven by the electric motor about a drill axis, the depth stop assembly comprising:

a depth stop rod;

a fastener having an engagement end which is releasably securable within the threaded aperture in the housing; and a mounting block having a mounting surface cooperating with the housing, a projection extending from the mounting surface and projecting into the recess of the housing, a first aperture spaced from the housing and extending about a first axis generally parallel with the drill axis through which the depth stop rod is movably mounted, and a second aperture extending about a second axis along which the fastener extends, wherein the mounting block has a first mounting block half and a second mounting block half, the mounting block halves cooperating to releasably capture the depth stop rod therebetween;

wherein when the fastener is secured within the threaded aperture in the housing, the fastener and mounting block cooperate to prevent the depth stop rod from moving axially along the first axis.

15. A portable electric drill assembly comprising:

a drill including a housing having a threaded aperture and at least one recess adjacent to the threaded aperture, an electric motor, and a chuck operatively driven by the electric motor about a drill axis;

a depth stop rod;

a mounting block having a mounting surface adapted to cooperate with the housing, a first aperture spaced from the housing for supporting the depth stop rod generally parallel to the drill axis, and a second aperture extending along a fastener axis, the mounting surface having a projection thereon which is cooperatively received by the at least one recess in the housing;

the mounting block including a first mounting block half having the mounting surface thereon and a second mounting block half which cooperates with the first mounting block half to releasably capture the depth stop rod therebetween while preventing relative rotation of the first and second mounting block halves above the fastener axis;

a rotatable handle; and a fastener extending through the mounting block second aperture along the fastener axis and having two ends respectively cooperative with the housing threaded aperture and the handle to releasably entrap the mounting block therebetween to enable a user to adjustably position the depth stop rod relative to the housing.

* * * * *